Figure 1:
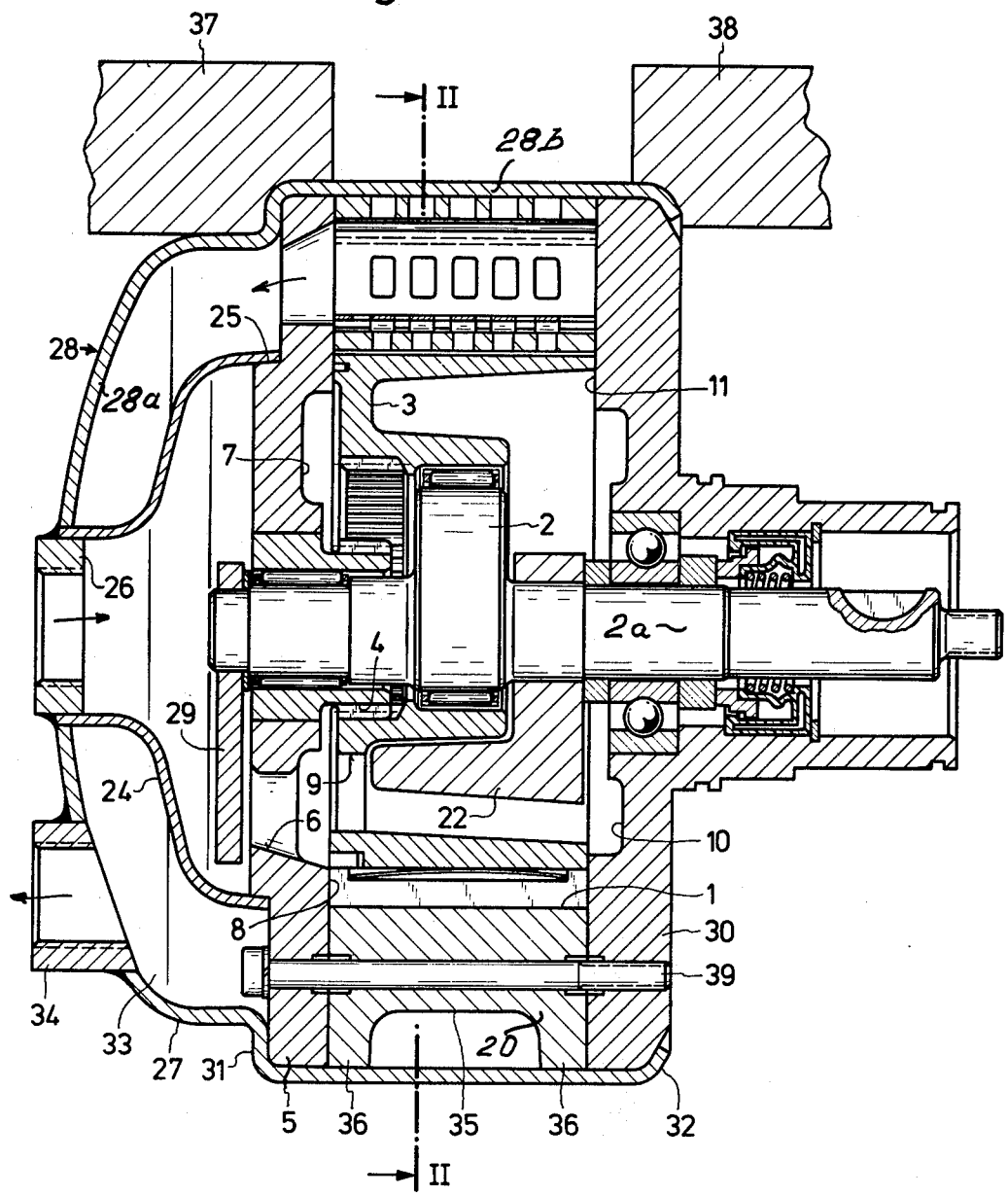

United States Patent [19]

Eiermann

[11] 4,278,409
[45] Jul. 14, 1981

[54] COMPRESSOR

[75] Inventor: Dankwart Eiermann, Lindau, Fed. Rep. of Germany

[73] Assignees: Borsig GmbH; Wankel GmbH, both of Berlin, Fed. Rep. of Germany; a part interest

[21] Appl. No.: 78,681

[22] Filed: Sep. 25, 1979

Related U.S. Application Data

[63] Continuation of Ser. No. 867,770, Jan. 9, 1978, abandoned.

[30] Foreign Application Priority Data

Jan. 7, 1977 [DE] Fed. Rep. of Germany ....... 2700522

[51] Int. Cl.³ .............................................. F04C 29/00
[52] U.S. Cl. ............................ 418/61 A; 29/156.4 R; 418/151; 418/270
[58] Field of Search ...................... 418/270, 151, 61 A; 92/169; 29/156.4 R

[56] References Cited

U.S. PATENT DOCUMENTS

| 3,302,622 | 2/1967 | Jones | 418/101 |
| 3,377,873 | 4/1968 | Patterson, Jr. | 418/151 X |
| 3,738,784 | 6/1973 | Clark et al. | 418/270 |
| 3,876,344 | 4/1975 | Nestor | 418/151 X |
| 4,002,107 | 1/1977 | Erickson et al. | 92/169 X |

FOREIGN PATENT DOCUMENTS

| 807812 | 1/1937 | France | 29/156.4 R |
| 2239605 | 2/1975 | France | 92/169 |

Primary Examiner—Leonard E. Smith
Attorney, Agent, or Firm—Becker & Becker, Inc.

[57] ABSTRACT

A rotary piston compressor including a main housing part composed of a plurality of interconnected components one of which has a trochoidal two arc-shaped inner surface forming a race way, and a triangular piston rotatable in the eccentric of an eccentric shaft. The corners of the triangular piston are in continuous sliding contact with the race way. The components are surrounded by a capsule housing which on one side of the compressor has a pressure connection arranged in a dome-shaped cover. This cover includes a hood separating the high pressure section from the low pressure section. The cover is connected to the hood by a central member forming a connection for the inlet conduit. The hood sealingly engages a step in the adjacent housing component. The capsule housing has an annular shoulder by means of which under tension it extends around the outer rim portion of the component adjacent to the cover, then extends over the other components, and is bent over the outer peripheral rim portion of the component farthest from the cover. The piston has a side wall on only one side and is pot-shaped while the counter weight for the piston is arranged in the latter.

9 Claims, 2 Drawing Figures

COMPRESSOR

This is a continuation of co-pending parent application Ser. No. 867,770 Eiermann file Jan. 9, 1978, now abandoned.

This invention relates to compressors of the eccentric rotary piston type comprising a piston rotatable in a housing on an eccentric carrying shaft. Such a compressor will hereinafter be referred to as of the kind specified.

Moreover, the present invention relates to a fully sealed rotary piston compressor with a fixed housing made up of a plurality of disc-shaped components and having a trochoidal two-lobed peripheral running surface and a three-cornered piston rotatable on an eccentric-carrying shaft, the piston having its apeces in continuous sliding contact with the running surface.

Known compressors of the kind specified include a counterweight mounted on the shaft and axially spaced from the piston. A disadvantage of this construction consists in that the size of the piston and counterweight effectively limit the size of the compressor.

Heretofore known fully sealed rotary piston compressors are employed primarily in sealed refrigeration circuits or in compressed air braking systems. Their housings are held together by screws in order to secure the disc-shaped components against displacement or rotation, the sealing being achieved by the insertion of sealing means between the individual disc-shaped components. Such constructions require the provision of a substantial number of screws and are expensive to assemble. Furthermore, in refrigeration compressors there is the danger of chemical attack on the sealing means which can lead to a serious loss of the working fluid over long periods of time.

Many sealed compressors have been provided in which the screwed housing is enclosed in a casing. U.S. Pat. No. 3,135,460 or German Offenlegungsschrift No. 1,428,050 show examples in which such a casing, comprising a cylindrical part and two end covers, is held together by screws and is closed in a gas-tight and liquid-tight manner.

German Pat. No. 822,393 and German Offenlegungsschrift No. 2,012,233 show examples in which the casing is sealed by soldering or welding. In German Offenlgungsschrift No. 2, 012,233 the parts of the housing of the compressor are located in position by two dowels and the end covers are connected to a convex cylindrical peripheral component of the casing by welding. Difficulties arise here in obtaining the necessary pressure for tight assembly of the housing. Accordingly in German Offenlegungsschrift No. 2,012,233 there is proposed the additional use of locating bolts which pass through the cover and the components of the casing and secure them together. However this construction requires a substantial outlay in assembly and leads, on welding, to undesired thermal stresses during welding and on operation, with thermal expansion, to unknown distortions and movements of the components of the housing.

It is an object of the present invention to provide a compressor which substantially overcomes the above mentioned disadvantages. In particular it is an object of the present invention to provide a compressor having as compact and space-saving a construction as possible which is necessary for compressors which are used without maintenance or servicing in closed refrigeration circuits, for example in vehicles, or in braking systems.

It is also an object of the present invention to provide a compressor which is simple to assemble and which avoids the cost of manufacture involved in the known constructions which require welding or soldering or screwing together of the components.

According to the present invention there is provided a compressor of the kind specified in which the counterweight is mounted on the shaft within the piston.

Figure 2:
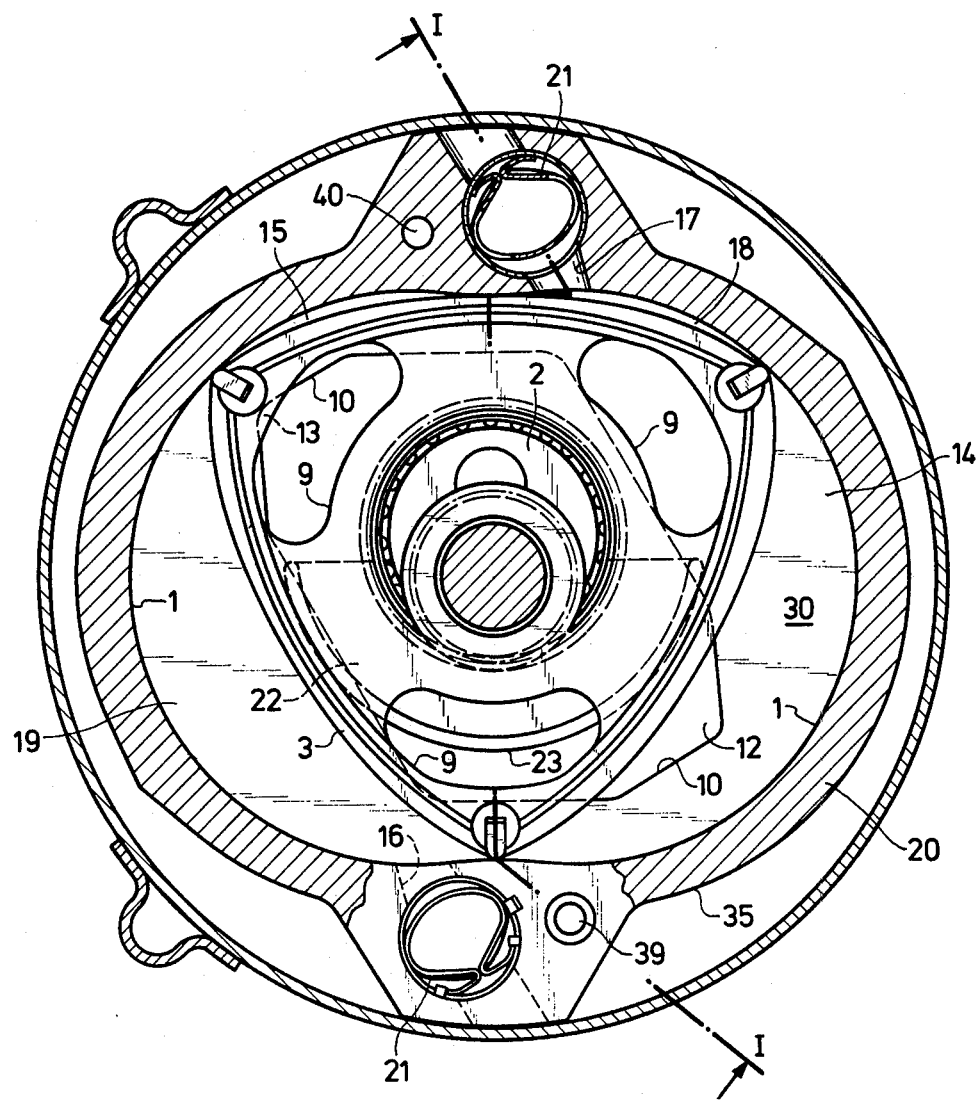

An embodiment of the invention, by way of example only, will now be described in more detail with reference to the accompanying drawings, in which:

FIG. 1 shows an axial section through a rotary piston compressor according to the invention, along the line I—I of FIG. 2, and FIG. 2 shows the same compressor in a radial section, along the line II—II of FIG. 1.

The compressor shown includes a housing having a trochoidal two-lobed peripheral running surface 1 and a three-cornered piston 3 which is rotatable about an eccentric 2 mounted on a shaft 2a under the control of gearing 4 so as to be in continuous sliding contact through its apeces with the running surface 1.

The housing comprises three generally disc-shaped components 5, 20 and 30 which are located in position by two dowel screws 39 and 40. An inlet port 6 formed in the outer disc-shaped component 5 communicates with a pocket-like recess 7 formed in the inner surface 8 of the disc-shaped component 5. A similar recess 10 formed on the inner surface of the outer disc-shaped component 30 communicates with the recess 7 through openings 9 formed in the piston 3.

The piston 3 is cup-shaped, the open end facing the outer disc-shaped component 30 and the closed end facing the outer disc-shaped component 5. The openings 9 are formed in the closed end and, as shown in FIG. 2, there are three such openings. A counterweight 22 is mounted on the shaft 2a within the piston 3. The radially outer periphery 23 of the counterweight forms an arc of a circle with its center on the axis of the eccentric 2. A part of the counterweight 22 is visible through the lower opening 9 in FIG. 2, the remaining part being shown in broken lines. With this construction the counterweight does not increase the overall length of the compressor and accordingly a substantial reduction in the length of the compressor is achieved as compared with the known compressors.

The peripheral edge of a dome-shaped member 24 is seated on and sealingly engages a shoulder 25 machined on the outer surface of the disc-shaped component 5. Member 24 has an inlet connector 26 provided in its central dome portion and any suitable supply means (not shown) is screwed into the connector for the supply of the working medium to the inlet port 6 of the housing. The free end of the shaft 2a extends through the housing into the dome-shaped member 24 and a balance member 29 mounted on the free end is rotatable within the member 24.

The housing and member 24 are enclosed within a casing 28. The casing 28 comprises a dome-shaped portion 28a which overlies the member 24 and is spaced therefrom to provide a hollow space 33 around the member 24 and a portion 28b which extends over the housing. The dome-shaped portion 28a has an opening through which the connector 26 extends and an outlet connector 34 in communication with the gap 33. The member 24 separates the high pressure region from the low pressure region and gives increased mechanical stiffness to the casing. The member 24 is welded to the casing 28 around the connector 26 prior to assembly of the compressor. The portion 28b is sealingly connected to the housing by means of an annular shoulder 31 formed in the casing during assembly engaging the outer disc-shaped component 5 and a lip 32 formed in the casing during assembly engaging the outer disc-shaped component 30. The casing thus holds the three disc-shaped components of the housing together under stress. The casing is conveniently pressed onto the housing by means of circumferentially moving press tools indicated diagrammatically at 37 and 38 with a high engaging pressure.

The central disc-shaped component 20 is formed with an annular channel-shaped recess 35 which is circumferentially continuous with the exception of where it is interrupted by delivery valves 21 which leave standing only relatively narrow rim portions 36 engaging the associated outer disc-shaped components 5 and 30.

The piston 3 defines with the peripheral running surface 1 two intake chambers 14 and 15 respectively and two compression chambers 18 and 19 respectively. The corners of the recesses 7 and 10 form inlets 12 and 13 to the intake chambers 14 and 15 respectively. Outlets 16 and 17 from the compression chambers 18 and 19 respectively extend through the peripheral running surface 1 and communicate with the gap 33. The outlets 16 and 17 are controlled by respective delivery valves 21 inserted axially in the central disc-shaped component 20. The valves 21 form the subject of our copending U.S. Patent Application Ser. No. 867,769 Eiermann filed Jan. 9, 1978 (Monday) on even date with the present disclosure and now U.S. Pat. No. 4,149,834 Eiermann issued Apr. 17, 1979, to which the reference can be made for further details of their construction and operation. Valves 21 may be replaced by any of the known valves used in compressors of the eccentric rotary piston type.

The assembly of the compressor is as follows: The disc-shaped components 5, 20 and 30 are brought together without any seals, after the insertion of the piston 3 and counterweight 22. They are then located and joined together by the insertion and tightening of the dowel screws 39 and 40. The casing 28 is then pressed on by means of the press tools 37 and 38. During the pressing on of the casing, the member 24, which has previously been welded to the casing 28, is simultaneously pressed onto the shoulder 25 and sealed relative to the disc-shaped component 5. When the casing is pressed onto the housing, the edges of the outer disc-shaped components and the flange portions 36 are slightly deformed inwards so that any gaps between the components are permanently sealed under the pressure of the bending load in flange portions.

Accordingly it is unnecessary, apart from the provision of the locating dowel screws 39 and 40, to screw the components of the housing together with a large number of screws which was an expensive and time-consuming operation in the manufacture of known compressors. Preferably the housing is sealed by the provision of a viscous sealing medium in the region of the gaps between the disc-shaped components and the casing, thereby eliminating the need for any further housing seals. It is therefore possible to use in the compressor according to the invention working mediums which attack the seals required in the known compressors without any danger.

It will be apparent from the foregoing that mounting the counterweight 22 within the piston 3 and pressing the casing 28 onto the housing allow the manufacture of a compact and relatively cheap compressor as compared to the known compressors.

Furthermore it will be appreciated that the preferred features of mounting the counterweight within the piston and of pressing the casing onto the housing may be applied separately or together to any compressor of the eccentric rotary piston type.

Sealing means "S" are arranged between components as well as between components and the capsule housing as shown in FIG. 1.

It is, of course, to be understood that the present invention is by no means limited to the specific showing in the drawings but also comprises any modifications within the scope of the appended claims.

What I claim is:

1. A rotary piston compressor which includes: a main housing part composed of a plurality of interconnected components, one of said components having a trochoidal two-arc shaped inner surface forming a race way, a rotatable eccentric shaft provided with an eccentric, a triangular piston rotatable on said eccentric and having its corners in continuous sliding engagement with said race way, and a counter weight mounted on said eccentric shaft and located within said piston, a capsule housing, and a dome-shaped cover, said capsule housing on one side of said compressor having a pressure connection arranged in said dome-shaped cover, said compressor having a high pressure section and a low pressure section, said cover comprising a hood having at least its major portion arranged within said cover and separating said high pressure section from said low pressure section, said cover including a central member forming a connection for an inlet conduit.

2. A compressor according to claim 1, in which the housing component adjacent said hood has an annular step sealingly engaged by said hood and in which said capsule housing extends under tension around the outer rim portion of the component adjacent to said cover and then extends over the other components and is bent over the outer peripheral rim portion of the component farthest from said cover.

3. A compressor according to claim 1, in which said counter weight has an arcuate profile with the center of curvature thereof being located on the axis of said eccentric.

4. A compressor according to claim 1, in which said piston has a side wall on only one side and is cup-shaped.

5. A compressor according to claim 1, which includes at least two bolts interconnecting said components.

6. A compressor according to claim 1, in which said dome-shaped cover has an oulet connection communicating with the chamber formed by said dome-shaped cover and said hood, said chamber communicating with an outlet of said main housing part.

7. A compressor according to claim 1, which includes sealing means arranged between said components and between said components and said capsule housing.

8. A compressor according to claim 1, in which said main housing part comprises three disc-shaped components.

9. A compressor according to claim 8, in which said central component has a circumferential channel-shaped recess around its periphery, the wall portions of said recess defining respective flange portions engaging the adjacent outer disc-shaped components.

* * * * *